United States Patent
Ksiezopolski et al.

(10) Patent No.: US 11,305,681 B2
(45) Date of Patent: Apr. 19, 2022

(54) CUTTABLY REPLACEABLE BULB SEAL

(71) Applicant: LTI Flexible Products, Inc., Modesto, CA (US)

(72) Inventors: Edwin E. Ksiezopolski, Granger, IN (US); Kevin J. Ksiezopolski, Granger, IN (US)

(73) Assignee: Lifetime Industries, Inc., Pleasanton, CA (US)

( * ) Notice: Subject to any disclaimer, the term of this patent is extended or adjusted under 35 U.S.C. 154(b) by 239 days.

(21) Appl. No.: 16/774,363

(22) Filed: Jan. 28, 2020

(65) Prior Publication Data
US 2021/0229590 A1 Jul. 29, 2021

(51) Int. Cl.
*B60P 3/34* (2006.01)
*B60R 13/06* (2006.01)
*B60J 10/00* (2016.01)

(52) U.S. Cl.
CPC .............. *B60P 3/34* (2013.01); *B60J 10/00* (2013.01); *B60R 13/06* (2013.01)

(58) Field of Classification Search
CPC .... B60R 13/06; B60P 3/34; B60P 3/38; B60P 3/39; B60J 10/00
See application file for complete search history.

(56) References Cited

U.S. PATENT DOCUMENTS

| | | | | |
|---|---|---|---|---|
| 2008/0073925 A1* | 3/2008 | Ksiezopolski | .......... | B60J 10/00 296/26.01 |
| 2013/0269262 A1* | 10/2013 | Siegel | .................... | B60R 13/08 49/492.1 |
| 2014/0001710 A1* | 1/2014 | Siegel | ...................... | F16J 15/04 277/630 |
| 2014/0225333 A1* | 8/2014 | Siegel | ...................... | B60P 3/32 277/630 |
| 2015/0158438 A1* | 6/2015 | Ksiezopolski | .......... | B60R 13/06 277/638 |
| 2015/0274093 A1* | 10/2015 | Ksiezopolski | .......... | B60P 3/341 277/637 |
| 2015/0291236 A1* | 10/2015 | Kseizopolski | ........... | F16J 15/50 277/637 |
| 2016/0003358 A1* | 1/2016 | Young | ..................... | B60J 10/00 277/645 |
| 2016/0114715 A1* | 4/2016 | Newhouse | ............... | B60J 10/00 277/642 |
| 2016/0201893 A1* | 7/2016 | Ksiezopolski | ........ | E04B 1/6815 362/311.02 |

(Continued)

*Primary Examiner* — Gregory A Blankenship
(74) *Attorney, Agent, or Firm* — Botkin & Hall, LLP (57) ABSTRACT

A resilient seal for living quarters that is for sealing around a slide out room that has an aperture slidably receiving a slide out room. The resilient seal has a pair of attaching members extending along the inside and outside surfaces of the main living area wall at the aperture and includes a connecting member that extends between the attaching members and along the edge of the wall defining the aperture. A wiper seal extends from the connecting member for sealing against a wall of a slide out room. A bulb portion is integrally joined to a bridge wall that is bonded to L-shaped tabs on the attaching portion. The bridge wall may be severed from the L-shaped tabs to reveal a groove connector to receive a separate bulb portion connectable thereto. This facilitates replacement of the integral bulb portion.

18 Claims, 6 Drawing Sheets

(56) References Cited

U.S. PATENT DOCUMENTS

| | | | |
|---|---|---|---|
| 2016/0207438 A1* | 7/2016 | Ksiezopolski | F16J 15/021 |
| 2016/0214524 A1* | 7/2016 | Goode | B60P 3/34 |
| 2018/0043844 A1* | 2/2018 | Ksiezopolski | F16J 15/027 |
| 2018/0080558 A1* | 3/2018 | Maloney | B60J 10/00 |
| 2020/0317143 A1* | 10/2020 | Goode | B62D 21/14 |
| 2021/0229590 A1* | 7/2021 | Ksiezopolski | B60R 13/06 |

* cited by examiner

CUTTABLY REPLACEABLE BULB SEAL

BACKGROUND OF THE INVENTION

Recreational vehicles such as motor homes and travel trailers are commonly equipped with one or more slide out rooms that are retracted within the main living quarters when the unit is transported, but can be extended from the main living quarters to provide auxiliary space when the unit is parked. The seal typically has a resilient wiper portion to seal the sliding wall of the room and a resilient face sealing portion to mate with a flange on the room. Commonly, bulb portions are used as the face seal and extend around the aperture defined in the outside of the sidewall of the main living quarters through which the slide out room extends and retracts. This seal is engaged by a first flange on the exterior side of the slide out room to seal the gap between the slide out room and the main living quarters when the slide out room is retracted. Similarly, a second bulb portion extends around the aperture on the inside of the sidewall and is engaged by a second flange on the interior side of the slide out room when the slide out room is extended for use. Wiper seals are mounted on sidewalls adjacent to the aperture and are flexed against corresponding walls of the slide out room. The bulb portions seal the slide out room in the extended and retracted positions, and the wiper seal wipes against the slide out room as it is extended and retracted to prevent moisture and debris from entering the vehicle. Many designs are available that have a separate bulb portion that attaches to the main body of the seal. Others have an integral bulb portion. Due to environmental factors and use, the bulb portion is prone to wear and damage. With an integral bulb portion design, the entire seal assembly must be replaced, at significant expense and difficulty. An improved seal design is needed.

SUMMARY OF THE INVENTION

According to the invention, a resilient seal for mobile living quarters is provided for sealing around a slide out room of mobile living quarters having an aperture slidably receiving a slide out room. The resilient seal has an attaching member extending along the inside surface and commonly another one on the outside surface of the main living area wall at the aperture. Some include a connecting member extending between the attaching members and along the edge of the wall defining the aperture. A wiper seal extends from the attaching member or connecting member that flexes against the walls of the slide out room, and the optional connecting member may include an accordion pleat for adjusting the distance between the attaching members to accommodate walls of different thicknesses.

The seal has attaching members that have L-shaped tabs that are formed from upstanding and overhanging walls. One of the L-shaped tabs has a bulb portion integrally connected to the overhanging wall. A flipover wall is connected to the other L-shaped tabs and can move between a hooked and an unhooked position. In the unhooked position, the flipover wall can be pivoted away from the bottom wall to add fasteners. In the hooked position, the terminal edge of the flipover wall is located between the L-shaped tab and the bottom wall. The flipover wall is resilient and can be severed from its L-shaped tab. The bulb portion is located on the L-shaped tab and can be severed therefrom. When the bulb portion and flipover wall are severed, a replacement bulb seal can be received by the L-shaped tabs. The replacement bulb seal is offset to correspond with the position of the original bulb portion. This invention combines the ease of installation of a one piece seal and the serviceability of a separate bulb portion.

DESCRIPTION OF THE PREFERRED EMBODIMENT

Figure 1:
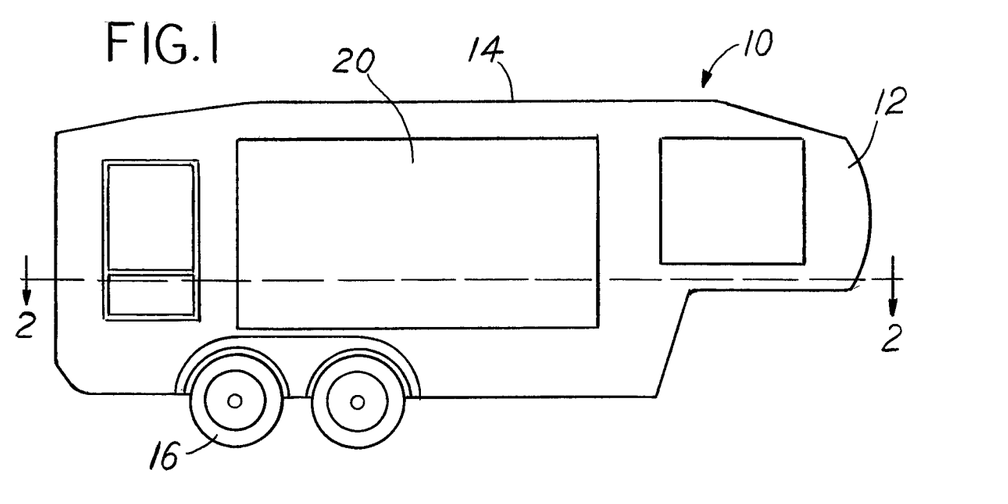
FIG. 1 is a side view of a trailer with a slide out room.
Figure 2:
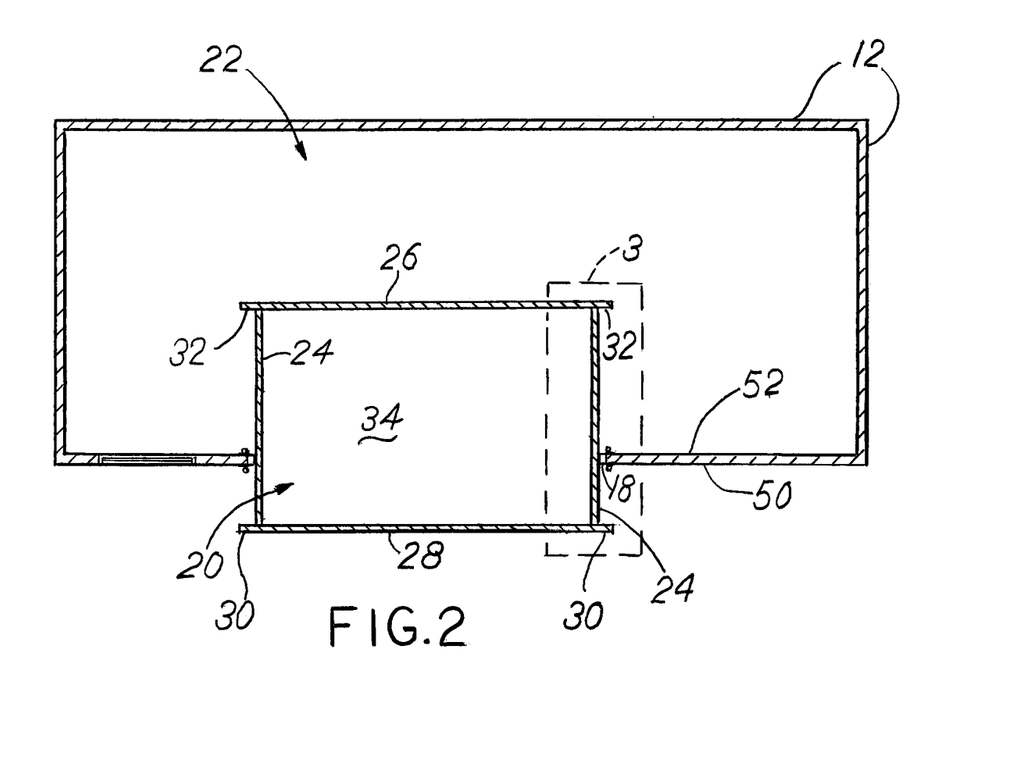
FIG. 2 is a cross-sectional view taken about the line 2-2 in FIG. 1.
Figure 3:
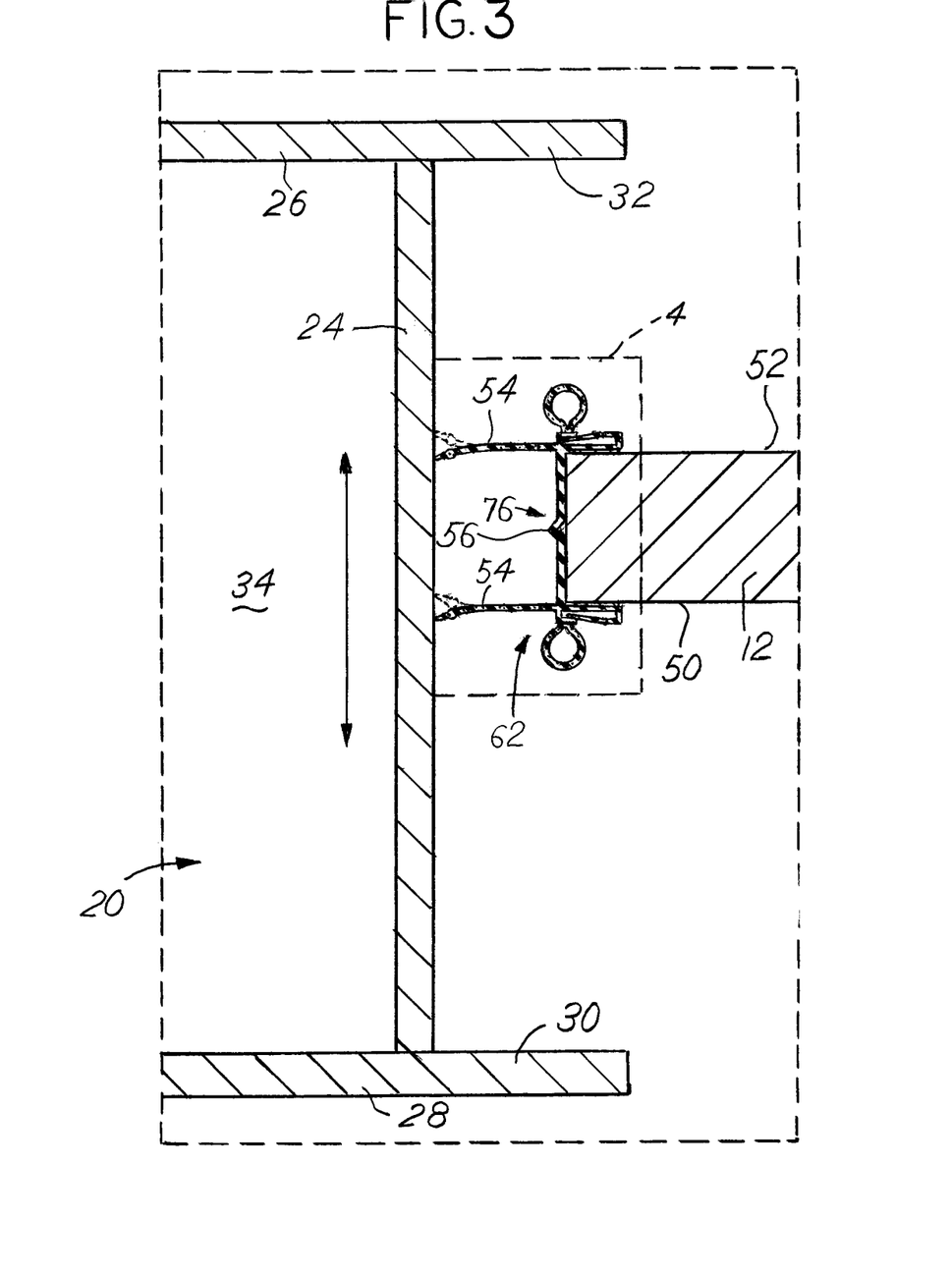
FIG. 3 is a magnified view of area 3 in FIG. 2.

Referring now to the drawings, mobile living quarters, such as the fifth wheel recreational vehicle 10 in FIG. 1, includes side walls 12 and a ceiling wall 14. The mobile living quarters 10 is mounted on wheels 16 for transport. An aperture 18 is provided in one of the side walls 12 and slidably receives a slide out room 20. This is best seen in the magnified view shown in FIG. 3. The side walls 12 and ceiling wall 14 cooperate to define an enclosed main living area generally indicated by the numeral 22 in FIG. 2. The slide out room 20 includes side walls 24, a ceiling wall 26, and a front wall 28. As known to those skilled in the art, the slide out room 20 is mounted for movement through the aperture 18, so that it may be retracted into the main living quarters 22 when the vehicle 10 is transported, but can be extended from the main living quarters when the vehicle is parked, thereby providing auxiliary living space. The slide out room 20 is shown in FIGS. 2 and 3 at a point between the extended and retracted position. The slide out room 20 includes an exterior flange 30 extending around the side walls 24 and front wall 28. The slide out room 20 includes another flange 32, being an interior flange, extending around the side walls 24 and ceiling wall 26 at the ends thereof opposite the ends joined to the front wall 28. The side walls 24, ceiling wall 26 and front wall 28 cooperate to define an auxiliary living area 34, which is available for use when the vehicle 10 is parked and the slide out room 20 is moved to the extended position.

Figure 4:
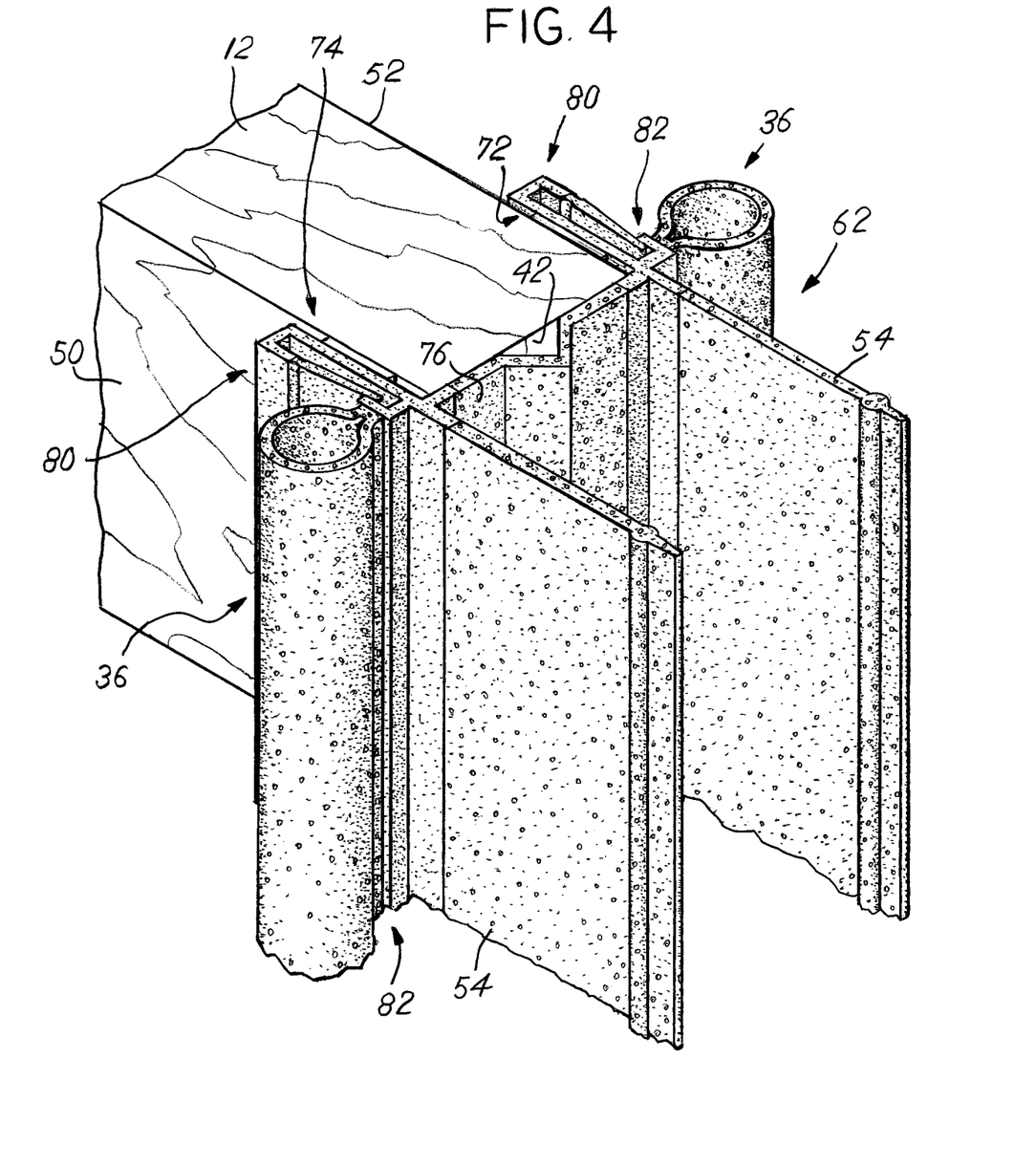
FIG. 4 is a partial isometric view 4 of a double-sided seal installed on a sidewall in FIG. 3.
Figure 5:
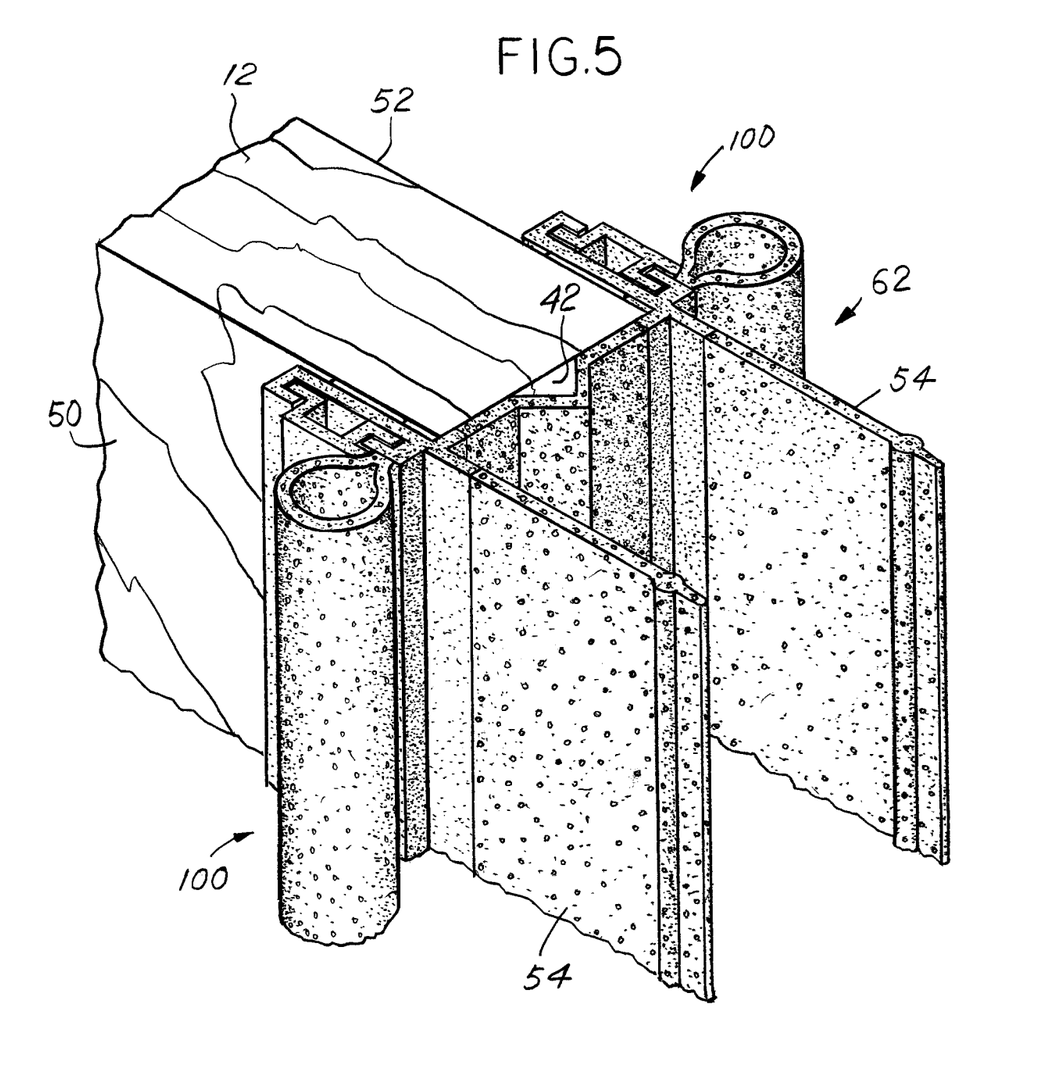
FIG. 5 is an isometric view of the seal as shown in FIG. 4 after replacing the bulb portion.
Figure 6:
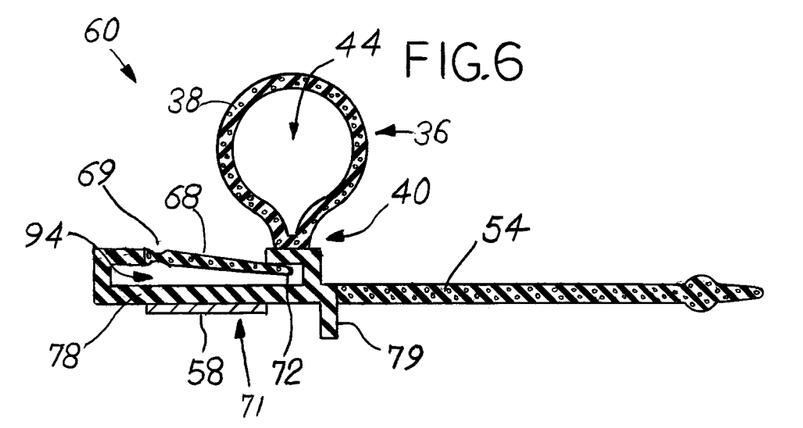
FIG. 6 is an end view of the seal.

FIG. 4 shows a double-sided version of the seal 62 in isometric as it is assembled onto a sidewall 12. A single-sided version of the seal 60 is shown in FIG. 6 and has a single attachment member 71. The two sided seal 62 has a pair of longitudinal attachment members 72, 74, which are connected by a longitudinal connecting member 76, which extends over the transverse edge 42 of the sidewall 12.

It is necessary to assure that moisture, dirt, debris, etc. be prevented from entering the living quarters. Seal 60 or seal 62 is installed adjacent to the aperture 18, as shown in FIGS. 2 and 3. Each seal 60, 62 must provide sealing at the extended position, retracted position, and all intermediate positions. The single sided seal is shown in FIG. 6. This has the same structure as the embodiment shown in FIG. 4 but lacks the connecting member 76. This allows the user to install the seal 60 on one side only if desired, or both sides separately. Seal 60 is a single sided seal (as shown in FIG. 6) and seal 62 is a two sided seal (shown in FIG. 4). The single sided seal 60 includes a stop wall 79 that is designed to overlay and directly contact the transverse edge 42. The stop wall 79 extends from an attaching member 71 that is designed to affix to the wall 12 adjacent the aperture and overlay either the exterior surface 50 or interior surface 52. The stop wall 79 contacts the transverse edge 42, which sets the position of the seal 60. A typical installation would have one double-sided seal 62 installed as shown in FIG. 4 or two single-sided seals 60 installed. The main difference between seals 60 and 62 is that seal 62 has a connecting member 76 instead of the stop wall 79. For seal 62, an integral attaching member 72, 74 is designed to affix to wall 12 adjacent the aperture and overlay part of the exterior surface 50 or interior surface 52. When seal 60 is installed, it is typically installed on both the exterior surface 50 and the interior surface 52. Wiper seals 54 engage the side walls 24, ceiling wall 26, and front wall 28 of the slide out room to wipe against the walls as the slide out room 20 extends and retracts. The seals 60, 62 are commonly made through a continuous extrusion process and are consistent along their entire length, so that an appropriate length can be cut and installed. The wiper seals 54 are shown as extending from their corresponding attaching member 71, 72, 74, but it is contemplated that they extend outwardly from the connecting member 76 or stop wall 79. The wiper seals 54 are formed from a resilient material that allows them to bend, deflect, and move when the room 20 moves. This is shown in FIG. 3.

To facilitate sealing of the room 20 to the side wall 12 in the extended and retracted positions, the seal 60, 62 is mounted around the aperture 18 on the exterior surface 50 and the interior surface 52 of the side wall 12 adjacent the aperture 18 and includes an offset severable bulb portion 36. Both seals 60, 62 have a severable bulb portion 36 that is bonded thereto. As shown in FIGS. 4 and 6, the bulb portion 36 is bonded to an outer groove tab 82 which extends from an attaching member 72, 74. The bulb portion 36 has a resilient semicircular wall portion 38 and a necked down portion 40 where it attaches to the outer groove tab 82. The inner groove tab 80 is clear of the bulb portion 36. The semicircular wall portion 38, and necked down portion 40 cooperate to form an enclosed area 44. It is contemplated that the severable bulb portion 36 is bonded to the inner groove tab 80.

Turning now to the details of the attachment members 71, 72, 74, attachment member 72 is a mirror image of attachment member 74. Because the attachment members are otherwise identical, the details of attachment member 72 will be discussed for simplicity. Attachment member 72 has a bottom wall 78 with L-shaped groove tabs 80, 82. One of the L-shaped tabs 82 is an outer tab, where it is closer to the wiper seal 54, and the other L-shaped tab 80 is an inner tab that is farther away from the wiper seal 54. The designations of inner and outer are merely for description and not to limit the position and usage of components. A flipover wall 68 is connected to the inner groove tab 80 and hooks under the outer groove tab 82. The flipover wall 68 has a thin portion 69 that allows the flipover wall 68 to be hinged to reveal an opening 92 and provide access to the bottom wall 78 where fasteners can be driven through to secure the seal 60, 62. After fasteners secure the seal 60, 62, the flipover wall 68 can be hooked under the outer groove tab 82 to conceal the opening 92 and fasteners. This forms an enclosed area. Each of the L-shaped groove tabs 80, 82 has an upstanding portion 84 and an overhang portion 86. The overhang portions 86 have a terminal edge 88, 90 that define the opening 92, shown in FIG. 10, if the flipover wall 68 is removed. The flipover wall 68 is comparatively more flexible than the overhang portions 86. The flipover wall 68 is formed from a material that is flexible enough to allow the user to bend it outwardly to install a fastener. The bulb portion 36 is hollow with the outer portion made of a lower durometer material than the attachment members 72, 74. FIGS. 6-9 show the different materials as indicated by the hatching.

The flipover wall 68 and bottom wall 78 forms a hidden cavity 94 that is capable of hiding mechanical fasteners such as screws driven through the bottom wall 78. Because the hidden cavity 94 is completely hidden and inaccessible unless the flipover wall 68 is cut or pivoted away, fasteners that are installed through the bottom wall 78 are covered and hidden. In addition to fasteners, optional adhesive tape 58 may be used to secure the seal 60, 62 to the sidewall 12.

Different manufacturers of mobile living quarters manufacture the sidewalls 12 from different materials and thus, the sidewalls 12 of different manufacturers are of different thicknesses. It is clearly desirable that the number of different variations of the seal 60, 62 be minimized. Accordingly, an accordion pleat extends along the length of the connecting member to permit the width of the connecting member to be adjusted, to thereby accommodate walls of varying thicknesses, as illustrated in FIG. 4.

In FIG. 4, the seal is in an intermediate position, to accommodate an average thickness sidewall. In this position, the accordion pleat 56 slightly projects into the space between the wiper seals 54. When the assembly is in the "open" position, it accommodates a wider sidewall. In the open position, the accordion pleat 56 is stretched out so that the connecting member 76 lies substantially flat against the transverse edge 42. It will be noted that as the attachment members 72, 74 are secured to their corresponding inside and outside surfaces 52, 50, the width of the connecting member 76 automatically adjusts to accommodate a sidewall 12 of any thickness between those accommodated by the fully open and fully closed positions. The pleat 56 is formed by scoring parallel, longitudinal score lines on the side of the connecting member 76 facing away from the transverse edge 42 and between the wiper seals 54, and by forming a third longitudinal score line on the side of the connecting portion 76 that lies against the transverse edge 42 when the seal assembly is installed on the sidewall. The third score line extends parallel to the score lines and is located midway between the latter. The first, second, and third score lines define corresponding first, second and third fold lines, thereby forming the accordion pleat 56.

To facilitate installation of the seal 60, 62 on the vehicle 10, a strip of double sided adhesive tape 58, may be connected to the attachment member 71, 72, 74 on the side facing the sidewall 12. The opposite side of the adhesive tape 58 that faces away from the attachment member 72 is covered by a protective removable coating that prevents it from sticking to anything before installation. Likewise, the other attachment member 74 may include a strip of double sided adhesive tape 58 attached to it and protected with a protective removable coating on the side that faces the side wall 12. For the single side seal 60, the tape 58 is located on attachment member 71.

After the adhesive tape 58 is attached to the outer surface 50 and/or inner surface 52 of the side wall 12, the seal may be more securely attached to the corresponding inside and outside surfaces 52 and 50 by appropriate mechanical fasteners. Screws or nails may be driven through the attachment members 71, 72, 74 into the side wall 12. This may be accomplished by bending back the flipover wall 68 to expose the portion of the attachment member that can receive the fastener. Wiper seals 54 extend from the attachment members 72, 74 and are adapted to flex against the side walls 24 and ceiling wall 26 of the slide out room 20 during extension and retraction of the slide out room.

Figure 7:
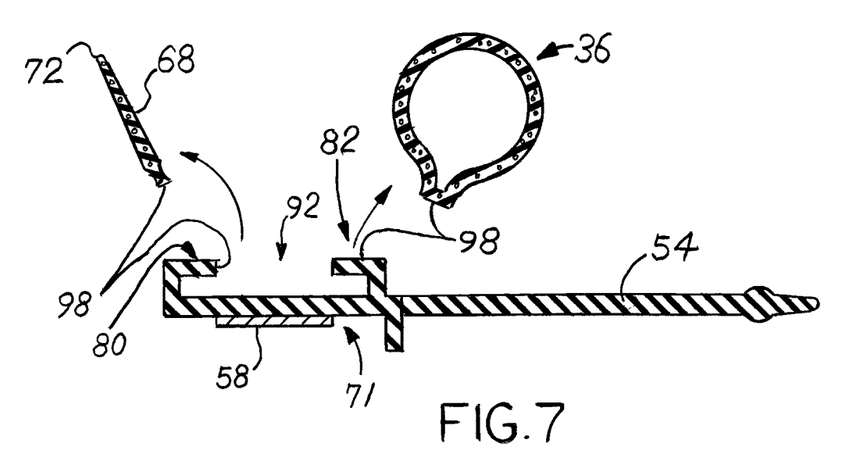
FIG. 7 is an end view of the seal in FIG. 6 with the old bulb portion being removed.
Figure 8:
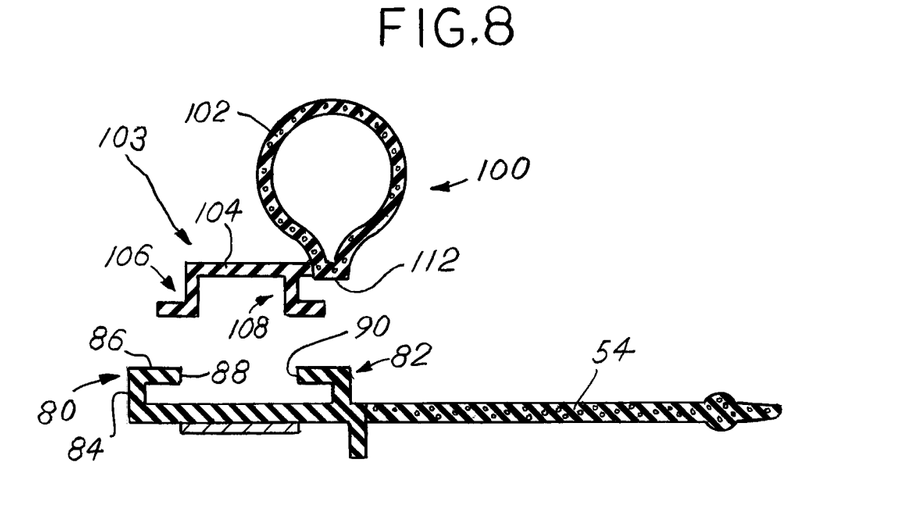
FIG. 8 is an end view of the seal in FIG. 7 with the new bulb portion being moved into position.
Figure 9:
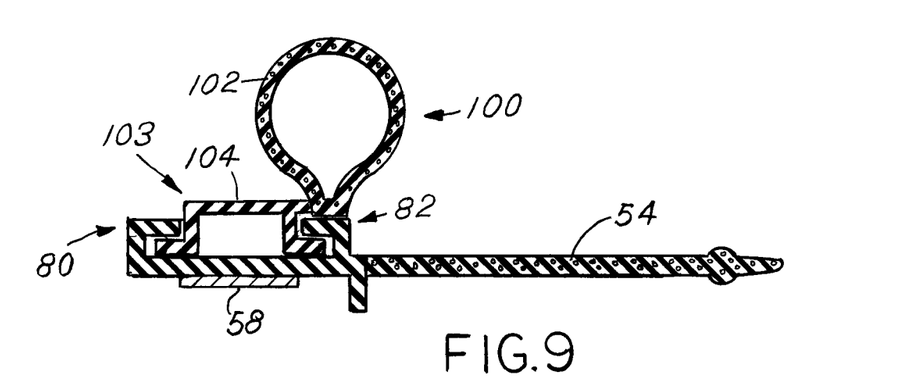
FIG. 9 is an end view of the seal in FIG. 8 with the new bulb portion installed.

At some point, the user may desire to replace the bulb portion 36. This could be as a result of normal wear, preventative maintenance, or damage. To replace the bulb portion 36, the user would cut the bulb portion 36 to sever it from the L-shaped tab 82 at a cut line 98, as is shown in FIG. 7, to separate it. The shape of the bulb portion 36 with the wall portion 38 and necked down portion 40 provide access to where the bulb portion 36 is connected. Where the necked down portion 40 meets the L-shaped tab 82, a knife or other cutting tool can be inserted and slid along to sever the bulb portion 36. Where the flipover wall 68 attaches to the inner L-shaped tab 80, it is thinner. Coupled with the more flexible material forming the flipover wall 68, the thinner area provides the user an easy visual indicator where to cut the portion of the bridge wall 68 over the opening 92. It is contemplated that in addition to the thin portion 69, a score line, ridge, or other visual indicator is present on the flipover wall 68 to make it easier to cut it aligned with the terminal edge 88. It is further contemplated that the flipover wall 68 could be separated without tools if the thin portion 69 was thin enough or had features to tear the flipover wall 68 by pulling. The cut line 98 is aligned with the terminal edges 88 of the inner L-shaped tab 80. Once the bulb portion 36 and flipover wall 68 are separated from their attachment portion 71, 72, 74, the opening 92 is revealed as is shown in FIG. 7. At that point, a replacement bulb seal 100 can be installed as shown in FIGS. 8 and 9.

The bulb portion 100 has a bulb portion 102 made from a flexible and resilient material and a mounting portion 103 made from a less flexible material than the bulb portion 102. This is shown best in FIG. 8. The mounting portion 103 has a wall 104 with a pair of L-shaped tabs 106, 108 that are complementary to the L-shaped tabs 80, 82 that are located on the attachment members 72, 74. The L-shaped tabs 106, 108 form a tongue that can mate with the groove connector formed by the L-shaped tabs 80, 82. The L-shaped tab has an upstanding portion and an overhang portion as shown in FIG. 8. The complementary nature of the tongue and groove allows the user to install the bulb portion 100 by slidably attaching the bulb portion 100 to the attachment portion. This is shown in FIG. 9. The offset nature of the bulb portion 102 positions it in the same place as the previously severed bulb portion 36. As shown in FIG. 8, the bulb portion 102 extends towards L-shaped tab 108 below the wall 104 and terminates at an abutment surface 112. The abutment surface 112 contacts the top of the groove tab 82. FIG. 3 shows the slide-out room 20 at a point between the opened and closed position. In the fully closed or fully opened position, the bulb 36 or 102 is compressed when the flange 30, 32 is in biased contact. When in the compressed position, the bulb portion 102 would otherwise deflect away and could cause a sealing issue. By having the abutment surface 112 close or in biased contact with the groove tab 82, flexing or distortion of the bulb portion 102 would be equivalent to any flexing or distortion of the original bulb portion 36.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A seal for living quarters having main living area walls defining a main living area, an aperture in one of said main living area walls slidably receiving a slide out room having slide out room walls defining auxiliary living space, said one main living area wall having an outside surface, an inside surface, and a transverse surface extending between said inside and outside surfaces, said transverse surface defining said aperture, said seal comprising:
   an attaching member for extending along said one main living area wall adjacent to said aperture, a wiper seal extending from said attaching member, said wiper seal for engaging one of said slide out room walls;
   said attaching member having a groove connector, said groove connector formed from a pair of upstanding walls extending from and substantially perpendicular to a bottom wall of said attaching member, each said upstanding wall terminating in a corresponding overhanging wall being substantially parallel to and spaced from said bottom wall, said upstanding walls and said overhanging walls forming L-shaped tabs each having a terminal edge, said terminal edges facing each other, said L-shaped tabs cooperating to form said groove connector;
   an integral bulb portion resiliently joined to one of said overhanging walls and extending in a direction away from said bottom wall, said integral bulb portion having a semicircular wall portion forming an enclosed area; and
   a flipover wall having a thin portion resiliently connected to said terminal edge of said other of said overhanging walls, said flipover wall and said attaching member forming a hidden cavity when a portion of said flipover wall is located between said one overhanging wall and said bottom wall, when said flipover wall is severed from said other overhanging wall, said groove connector can receive a complementary tongue portion on a replacement bulb portion.

2. The seal of claim 1, further comprising a second seal with a second attaching member, a connecting member extending therebetween and connecting said attaching members.

3. The seal of claim 2, further comprising an adjuster in said connecting member for adjusting a distance between said attaching members.

4. The seal of claim 3, wherein said wiper seal extending substantially perpendicularly from said connecting member and for engaging one of said slide out room walls.

5. The seal of claim 1, wherein said integral bulb portion has a necked down portion, said necked down portion being narrower where said integral bulb portion is affixed to said one overhanging wall.

6. The seal of claim 1, wherein one of said L-shaped tabs is an inner L-shaped tab, the other of said L-shaped tabs is an outer L-shaped tab, said outer L-shaped tab is adjacent said wiper seal, said integral bulb portion affixed to said outer L-shaped tab.

7. The seal of claim 6, wherein said integral bulb portion obscures said outer L-shaped tab, said integral bulb portion is clear of said inner L-shaped tab.

8. The seal of claim 1, further comprising said separate replacement bulb seal having a mounting portion to mate with said groove connector on said attaching member when said flipover wall and said integral bulb portion are severed from said attaching member.

9. A seal for living quarters having main living area walls defining a main living area, an aperture in one of said main living area walls slidably receiving a slide out room having slide out room walls defining auxiliary living space, said one main living area wall having an outside surface, an inside surface, and a transverse surface extending between said inside and outside surfaces, said transverse surface defining said aperture, said seal comprising:
- an attaching member for extending along said one main living area wall adjacent to said aperture, a wiper seal extending from said attaching member, said wiper seal for engaging one of said slide out room walls;
- said attaching member having a groove connector, said groove connector formed from a pair of upstanding walls extending from and substantially perpendicular to said attaching member, each said upstanding wall terminating in a corresponding overhanging wall being substantially parallel to and spaced from said attaching member, said upstanding walls and said overhanging walls forming L-shaped tabs, said L-shaped tabs cooperating to form said groove connector;
- an integral bulb portion resiliently joined to one of said overhanging walls, said integral bulb portion having a wall portion forming an enclosed area; and
- a flipover wall resiliently connected to a terminal edge of the other of said overhanging walls, said flipover wall and said attaching member forming a hidden cavity when said flipover wall is trapped by said one overhanging wall, when said flipover wall is severed from said other overhanging wall, said groove connector can receive a complementary tongue portion on a replacement bulb seal.

10. The seal of claim 9, wherein said seal has a second attaching member, said seal having a connecting member extending between said attaching members and located along said transverse surface, said connecting member including an adjuster for adjusting a distance between said attaching members.

11. The seal of claim 10, wherein said adjuster being an accordion pleat.

12. The seal of claim 10, further comprising a wiper seal extending substantially perpendicularly from said connecting member and for engaging one of said slide out room walls.

13. The seal of claim 9, wherein said integral bulb portion has a necked down portion, said necked down portion being narrower where said integral bulb portion is affixed to said overhanging wall.

14. The seal of claim 9, further comprising adhesive tape affixed to said attaching member for affixing said attaching member to said inside or said outside surface.

15. The seal of claim 9, wherein said flipover wall has a thin portion where said flipover wall attaches to said terminal edge, said thin portion providing a visual indicator to sever said flipover wall from said other overhanging wall.

16. The seal of claim 9, wherein one of said L-shaped tabs is an inner L-shaped tab, the other of said L-shaped tabs is an outer L-shaped tab, said outer L-shaped tab is adjacent said wiper seal, said integral bulb portion affixed to said outer L-shaped tab.

17. The seal of claim 16, wherein said integral bulb portion obscures said outer L-shaped tab, said integral bulb portion is clear of said inner L-shaped tab.

18. A seal for living quarters having main living area walls defining a main living area, an aperture in one of said main living area walls slidably receiving a slide out room having slide out room walls defining auxiliary living space, said one main living area wall having an outside surface, an inside surface, and a transverse surface extending between said inside and outside surfaces, said transverse surface defining said aperture, said seal comprising:
- an attaching member for extending along said one main living area wall adjacent to said aperture, a wiper seal extending from said attaching member, said wiper seal for engaging one of said slide out room walls;
- said attaching member having a groove connector, said groove connector formed from a pair of upstanding walls extending from and substantially perpendicular to said attaching member, each said upstanding wall terminating in a corresponding overhanging wall being substantially parallel to and spaced from said attaching member, said upstanding walls and said overhanging walls forming L-shaped tabs, said L-shaped tabs cooperating to form said groove connector;
- an integral bulb portion resiliently joined to one of said overhanging walls, said integral bulb portion having a wall portion forming an enclosed area;
- a flipover wall resiliently connected to a terminal edge of one of said L-shaped tabs, said flipover wall and said attaching member forming a hidden cavity when said flipover wall is trapped by said one overhanging wall; and
- said groove connector can receive a complementary tongue portion on a replacement bulb seal.

* * * * *